(12) United States Patent
Kim

(10) Patent No.: US 12,494,681 B2
(45) Date of Patent: Dec. 9, 2025

(54) ELECTRIC MOTOR

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 269 days.

(21) Appl. No.: 17/905,933

(22) PCT Filed: Mar. 2, 2021

(86) PCT No.: PCT/KR2021/002519
§ 371 (c)(1),
(2) Date: Sep. 8, 2022

(87) PCT Pub. No.: WO2021/182783
PCT Pub. Date: Sep. 16, 2021

(65) Prior Publication Data
US 2023/0060012 A1 Feb. 23, 2023

(30) Foreign Application Priority Data

Mar. 11, 2020 (KR) ........................ 10-2020-0030314

(51) Int. Cl.
*H02K 1/2713* (2022.01)
*B60N 2/02* (2006.01)
(Continued)

(52) U.S. Cl.
CPC ....... *H02K 1/2713* (2013.01); *B60N 2/02246* (2023.08); *H02K 1/148* (2013.01); *H02K 1/165* (2013.01); *H02K 7/06* (2013.01)

(58) Field of Classification Search
CPC ...... H02K 1/2713; H02K 1/148; H02K 1/165; H02K 7/06; H02K 3/28; H02K 1/146;
(Continued)

(56) References Cited

U.S. PATENT DOCUMENTS

2006/0232159 A1* 10/2006 Tamaoka ............... H02K 1/146
310/216.054
2009/0134738 A1   5/2009 Yoshikawa et al.
(Continued)

FOREIGN PATENT DOCUMENTS

GB          2303745 A    2/1997
KR   10-2009-0010017 A   1/2009
(Continued)

OTHER PUBLICATIONS

Office Action for KR10-2020-0030314 by Korean Intellectual Property Office dated Nov. 11, 2022.
(Continued)

*Primary Examiner* — Christopher M Koehler
*Assistant Examiner* — Riley Owen Stout
(74) *Attorney, Agent, or Firm* — BROADVIEW IP LAW, PC

(57) ABSTRACT

An electric motor for reciprocating an object along a rod having a predetermined length is provided, comprising: a housing; a rotor unit that is mounted to the inside of the housing via a bearing to be rotatable and comprises a rotor shaft, which is axially-coupled to the rod to linearly reciprocate along the rod during rotation, and a plurality of magnets mounted along the circumference direction of the rotor shaft; and a stator unit comprising at least one stator core and a coil, the at least one stator core comprising a yoke portion of a closed loop shape that is built in the housing so as to surround the circumference of the rotor unit, and a plurality of slot portions extending from the yoke portion toward the rotor, and the coil being wound around at least one slot portion among the plurality of slot portions.

10 Claims, 6 Drawing Sheets

(51) Int. Cl.
*H02K 1/14* (2006.01)
*H02K 1/16* (2006.01)
*H02K 7/06* (2006.01)

(58) Field of Classification Search
CPC ........ H02K 1/278; H02K 21/16; H02K 3/345;
H02K 3/48; H02K 7/063; H02K 41/031;
B60N 2/02246; B60N 2/1853; B60N 2/22
See application file for complete search history.

(56) References Cited

U.S. PATENT DOCUMENTS

| | | | |
|---|---|---|---|
| 2016/0226321 A1* | 8/2016 | Krishnasamy | B25J 9/126 |
| 2017/0267493 A1* | 9/2017 | Takahashi | H02K 19/10 |
| 2018/0198333 A1* | 7/2018 | Ohori | H02K 1/278 |

FOREIGN PATENT DOCUMENTS

| | | |
|---|---|---|
| KR | 10-2016-0121490 A | 10/2016 |
| KR | 10-2017-0113634 A | 10/2017 |
| KR | 10-2019-0048406 A | 5/2019 |
| WO | 2007/134704 A1 | 11/2007 |
| WO | 2009/066874 A2 | 5/2009 |

OTHER PUBLICATIONS

International Search Report for PCT/KR2021/002519 by Korean Intellectual Property Office dated Jun. 22, 2021.
Office Action for CN 202180019144.X by China National Intellectual Property Administration dated May 20, 2025.

* cited by examiner

ELECTRIC MOTOR

CROSS-REFERENCE TO RELATED APPLICATIONS

This application is a National Phase Entry Application of PCT Application No. PCT/KR2021/002519 filed on Mar. 2, 2021, which claims priority to Korean Patent Application No. 10-2020-0030314 filed on Mar. 11, 2020, in Korean Intellectual Property Office, the entire contents of which are hereby incorporated by reference in its entirety.

TECHNICAL FIELD

The present invention relates to an electric motor.

BACKGROUND ART

In general, in a seat of a vehicle, a backrest of the seat is adjusted or a position of the seat is changed by the electrical operation of a motor.

The seat is referred to as an electrically powered seat or a power seat, and a motor for driving the electrically powered seat or the power seat is referred to as a seat motor.

A recent vehicle-related technology trend is evolving into the technology related to hybrid electric vehicles or electric vehicles, and each vehicle component is being lightweight or miniaturized to increase energy efficiency.

Accordingly, in line with the trend of reducing the weight and size of the seat motor, developing a seat motor that may efficiently utilize space while maintaining the size of the conventional seat motor is required.

DISCLOSURE

Technical Problem

The present invention has been made in view of the above problems, and it is an object of the present invention to provide an electric motor capable of efficiently utilizing space while maintaining the entire size of the motor.

Technical Solution

To accomplish the above objects, according to one aspect of the present invention, there is provided an electric motor for reciprocating an object in a straight line along a rod having a predetermined length, the electric motor comprising: a housing; a rotor part including a rotor shaft rotatably mounted inside the housing via a bearing and axially coupled to the rod to reciprocate in a straight line along the rod when rotating, and a plurality of magnets mounted in a circumferential direction of the rotor shaft; and stator part including at least one stator core including a closed loop-shaped yoke part embedded in the housing to surround the circumference of the rotor part and a plurality of slot parts extending from the yoke part toward the rotor part, and a coil wound around at least one slot part among the plurality of slot parts, wherein the stator core includes a plurality of first slot parts in which coils are wound and a plurality of second slot parts in which the coils are not wound, wherein the plurality of first slot parts are disposed to surround an arc part corresponding to an angle of θ among the entire circumference of virtual circle connecting the ends of the plurality of first slot parts and the plurality of second slot parts, and the plurality of second slot parts are disposed to surround an arc part corresponding to an angle of 2π-θ among the entire circumference of the virtual circle.

In addition, the slot part may include teeth extending in a predetermined length from the yoke part and a shoe formed at an end of the teeth, wherein the teeth of the first slot part may have a length longer than that of the second slot part.

In this case, some of the plurality of the first slot parts may be formed of teeth having a first length, and the remaining first slot parts may be formed of teeth having a shorter length than the first length, wherein the first slot part including the teeth having the first length may be disposed between the first slot parts including the teeth having a length shorter length than the first length.

In addition, the first slot part including the teeth having the first length and the plurality of second slot parts may be disposed to be positioned on the opposite side with respect to the center point of the virtual circle.

In addition, the plurality of the first slot parts may include a plurality of first phase parts having a first phase when power is applied and a plurality of second phase parts having the second phase different from the first phase, wherein the total number of turns of the coil wound around the plurality of first phase parts and the total number of turns of the coil wound around the plurality of second phase parts may be the same. Here, the plurality of first phase parts may have a different total number of turns of coils wound around each of the first phase part.

In addition, the plurality of second slot parts may have the corresponding phase as the plurality of first slot parts when power is applied. For example, in the case where the plurality of first slot parts is provided to have three phases, the plurality of second slot parts may also be provided to have three phases corresponding to the three phases.

In addition, the stator core may be disposed such that the plurality of second slot parts is positioned in the housing at positions close to the lower surface of the housing, and the object may be fixed to upper surface of the housing.

In addition, the rotor shaft may include a first rotor shaft axially coupled to the rod to reciprocate in a straight line along the rod when rotating, and a second rotor shaft axially coupled to the first rotor shaft and having a plurality of magnets installed in a circumferential direction.

In addition, the stator part may include a plurality of stator cores stacked in a lengthwise direction of the rod such that one surface thereof contacts each other, and the plurality of stator cores may be integrated with each other via an insulating member.

In addition, the rotor shaft may be disposed to be positioned at an eccentric position inside of the housing.

In addition, the object may be an electrically powered seat of a vehicle. In other words, the electric motor may be used as a driving source for reciprocating the electrically powered seat of the vehicle.

Advantageous Effect

According to the present invention, the position of the rotor part to which the lead screw is coupled is disposed so as to be biased on one side, thereby efficiently utilizing space while maintaining the entire size of the motor.

MODE FOR INVENTION

Figure 1:
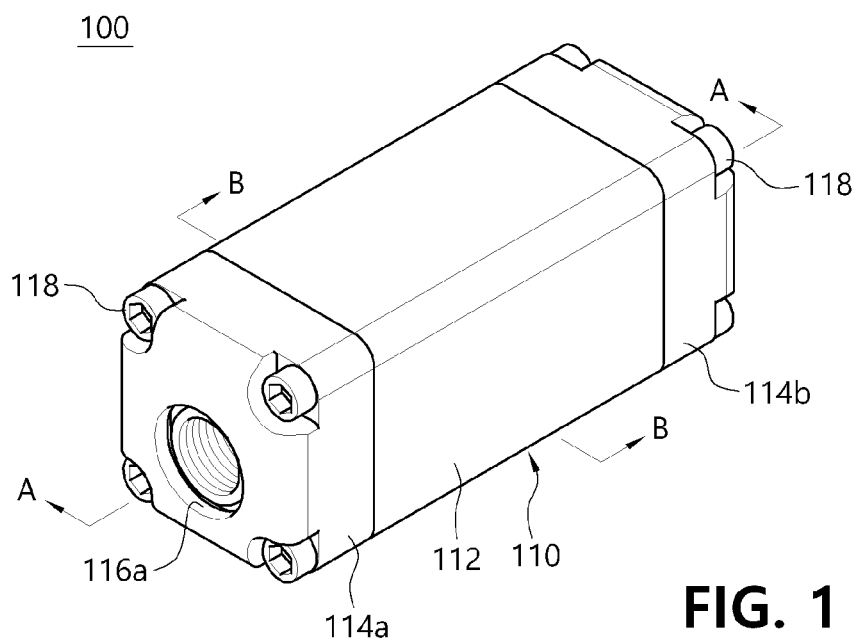
FIG. 1 is a view showing an electric motor according to one embodiment of the present invention.

Hereinafter, exemplary embodiments of the present invention will be described in detail with reference to the accompanying drawings in order to enable one of ordinary skill in the art to which the present invention pertains to easily embody the disclosure. The present invention may be implemented in various different forms and is not limited to embodiments described herein. To clearly describe the present invention, parts unrelated to the description have been omitted from the drawings, and like reference numerals are given to like or similar elements throughout.

An electric motor 100 according to one embodiment of the present invention may be used as a driving source capable of linearly reciprocating an object (not shown) along a rod 10 having a predetermined length.

Figure 7:
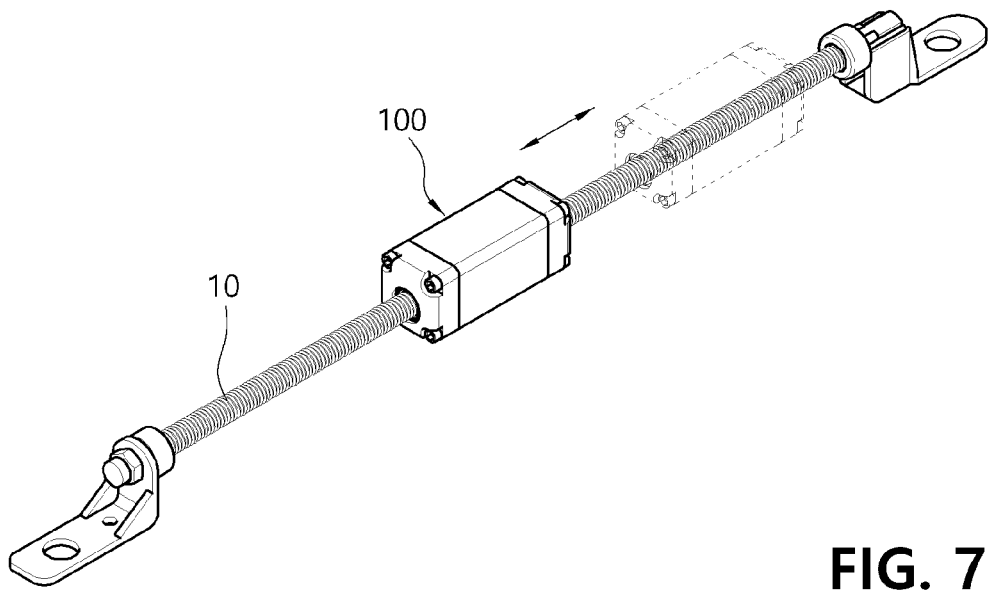
FIG. 7 is a view showing an electric motor according to one embodiment of the present invention coupled to a lead screw.

For example, the electric motor 100 according to one embodiment of the present invention as shown in FIG. 7 may be installed at the side of the rod 10 having a predetermined length and may reciprocate in the lengthwise direction of the rod 10 through relative movement when power is applied.

Here, the rod 10 may be a known lead screw installed on the bottom surface of the passenger space in order to install an electrically powered seat in the vehicle passenger space, and the object may be the electrically powered seat.

That is, the electrically powered seat may be fixed on one side of the electric motor 100 according to one embodiment of the present invention, and when the electric motor 100 is driven, the electrically powered seat may reciprocate in the lengthwise direction of the lead screw through the movement of the electric motor 100 reciprocating along the lead screw.

However, the use of the electric motor 100 according to one embodiment of the present invention is not limited thereto and may be used unlimitedly if used as a driving source for reciprocating the object along the lengthwise direction of the rod 10 having a predetermined length.

The electric motor 100 according to one embodiment of the present invention includes a housing 110, a rotor part 120 and a stator part 130 as shown in FIGS. 1 to 5.

The housing 110 may accommodate the rotor part 120 and the stator part 130 therein, and the object may be coupled to one side of the housing 110.

The housing 110 may include at least one of opening parts 116a and 116b so that the rod 10 may be inserted therein to be coupled to the rotor part 120.

For example, the opening parts 116a and 116b may be formed as one pair at both sides of the housing 110, and may be formed to be positioned corresponding to the ends of the rotor part 120.

Accordingly, the rod 10 may pass through the inside of the housing 110 in a lengthwise direction through the pair of openings 116a and 116b, and may be coupled to the rotor part 120.

In this case, the housing 110 may be configured in one member, but may be an assembly that a plurality of members is mutually coupled.

For example, the housing 110 may include a case 112 in which both ends thereof are opened and the rotor part 120 and the stator core 132 are accommodated therein, and a pair of covers 114a and 114b detachably coupled to both end sides of the case 112 via a fastening member 118.

In addition, a circuit board 140 for controlling driving of the rotor part 120 and the stator part 130 may be embedded in the housing 110.

The rotor part 120 may be rotatably mounted inside the housing 110 via at least one bearing 102a and 102b.

The rotor part 120 may be coupled to the rod 10 that passes through the housing 110 via the opening parts 116a and 116b, and may move along the rod 10 when rotating.

Accordingly, the electric motor 100 according to one embodiment of the present invention may linearly reciprocate along the rod 10 through the rotor part 120 when the rotor 120 rotates.

To this end, the rotor part 120 may include a hollow rotor shaft 122 that is axially coupled to the rod 10 and moves linearly and reciprocate along the rod 10 when rotating, and a plurality of magnets 124 installed along the outer circumferential surface of the rotor shaft 122.

When a current is supplied to the coil 137 wound around the stator part 130, the rotor part 120 may rotate through an interaction with a magnetic field generated from the coil 137.

In this case, the rotor part 120 may be disposed such that the rotor shaft 122 is positioned at an eccentric position inside the housing 110.

Figure 5:
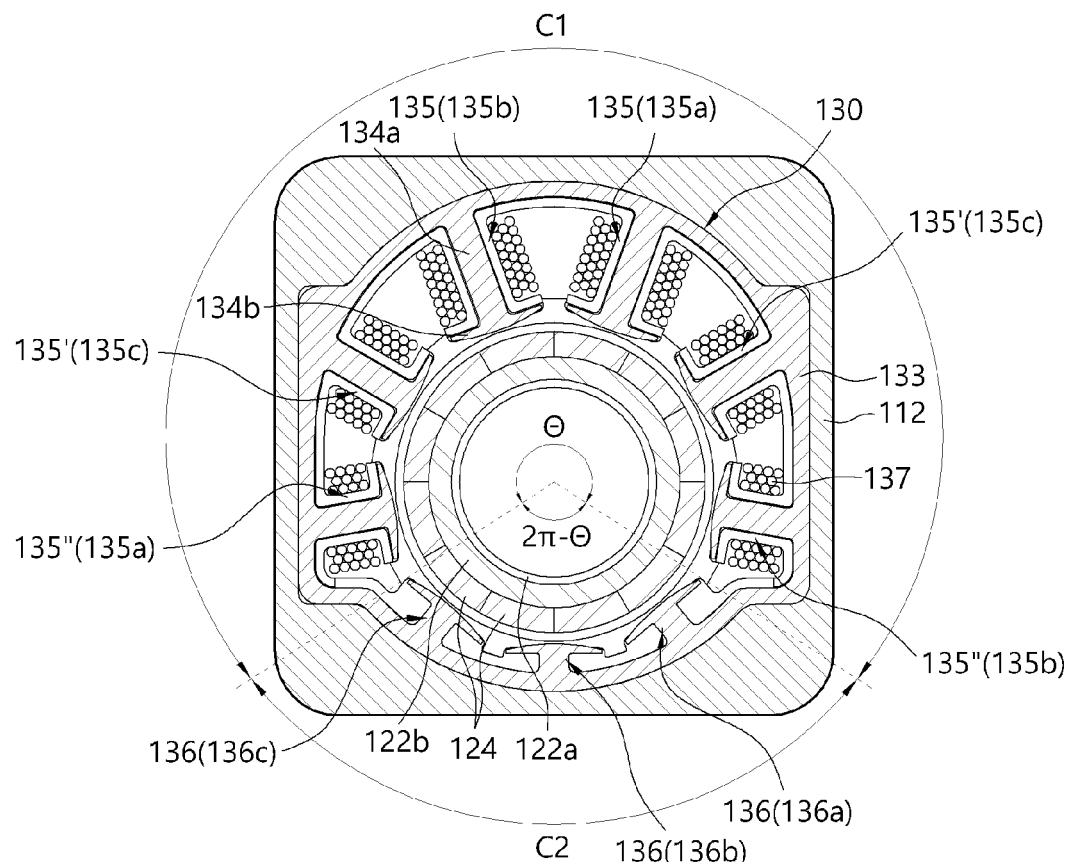
FIG. 5 is a front view of FIG. 4 showing a state in which the coil is wound around in FIG. 4.

In other words, as shown in FIG. 5, the rotor shaft 122 may be disposed inside the housing 110 to be positioned eccentrically from the center of the housing 110.

Accordingly, in the electric motor 100 according to one embodiment of the present invention, the rotor shaft 122 may be disposed at a position close to the lower surface of the upper surface and the lower surface of the housing 110.

Here, the upper surface of the housing 110 may be the top surface of the housing 110 in FIG. 5, and the lower surface of the housing 110 may be the bottom surface of the housing 110 in FIG. 5.

In this case, an object such as an electrically powered seat may be coupled to be positioned at an upper surface side of the housing 110, and the rotor shaft 122 may be positioned at a position close to the bottom surface of the passenger space of the vehicle.

Accordingly, when the rod 10 passes through the housing 110 and is coupled to the rotor shaft 122, a length from the rotor shaft 122 coupled to the rod 10 to a lower surface of the housing 110 may be minimized.

As a result, the rod 10 for guiding the movement of the object may be installed at a position close to the bottom surface of the vehicle passenger space, and even when a space between the bottom surface of the vehicle passenger space and the bottom surface of the housing 110 is insufficient, the electric motor 100 according to one embodiment of the present invention, by minimizing the length of the housing 110 protruding downward from the rod 10, may be connected to the rod 10 by using a narrow space without contacting the bottom surface of the vehicle passenger space, and may smoothly reciprocate along the rod 10.

In this case, the entire rotor shaft 122 may be axially coupled to the rod 10 but only a part corresponding to the part of the total length may be axially coupled to the rod 10.

For example, the rotor shaft 122 may include a hollow first rotor shaft 122a that is axially coupled to the rod 10 to linearly reciprocate along the rod 10 when rotating, and a hollow second rotor shaft 122b that is axially coupled to the first rotor shaft 122a and a plurality of magnets 124 are installed along an outer circumferential surface.

In this case, the rod 10 may be coupled axially to the first rotor shaft 122a, and may simply pass through inside of the second rotor shaft 122b. As a non-limiting example, the first rotor shaft 122a may be a known lead screw nut, and the rod 10 may be a known lead screw.

Accordingly, the first rotor shaft 122a may reciprocate forward and backward through screw movement along the lead screw when rotated, and the rotor shaft 122 may reduce frictional force by axially coupling only a part of the entire length to the rod 10, thereby reducing power consumption for driving.

In the present invention, although a shaft coupling method of the rod 10 and the rotor shaft 122 is illustrated as a screw coupling method, but is not limited thereto, various known shaft coupling methods may be applied if the rod 10 is shaft coupling and may reciprocate in a lengthwise direction of the rod 10 through rotation.

The stator part 130 may be disposed to surround the magnet 124 of the rotor part 120.

That is, the stator part 130 may be fixed to the inside of the housing 110 to surround a circumference of the rotor part 120, and may provide a driving force for rotating the rotor part 120 when power is applied.

To this end, the stator part 130 may include at least one of stator core 132 fixed inside of the housing 110, and a coil 137 wound around the stator core 132.

In particular, as shown in FIG. 5, the stator core 132 may include a closed loop shaped yoke part 133 fixed to the inside of the housing 110 and a plurality of slot parts 134 extending from the yoke part 133 toward the rotor part 120, and each of slot parts 134 may include teeth 134a extending at a predetermined length from the yoke part 133 and a shoe 134b formed at an end of the teeth 134a.

Here, the yoke part 133 may be formed to have non-circular shape, and the plurality of slot parts 134 may be formed in the yoke part 133 to form a virtual circle when the ends of each shoe 134b disposed to face the rotor part 120 are interconnected.

Accordingly, the plurality of slot parts 134 may be disposed at equal intervals in the circumferential direction of the rotor part 120 even if the yoke part 133 is formed in a non-circular shape, and may be disposed to be surround the entire circumferential surface of the rotor part 120.

Figure 2:
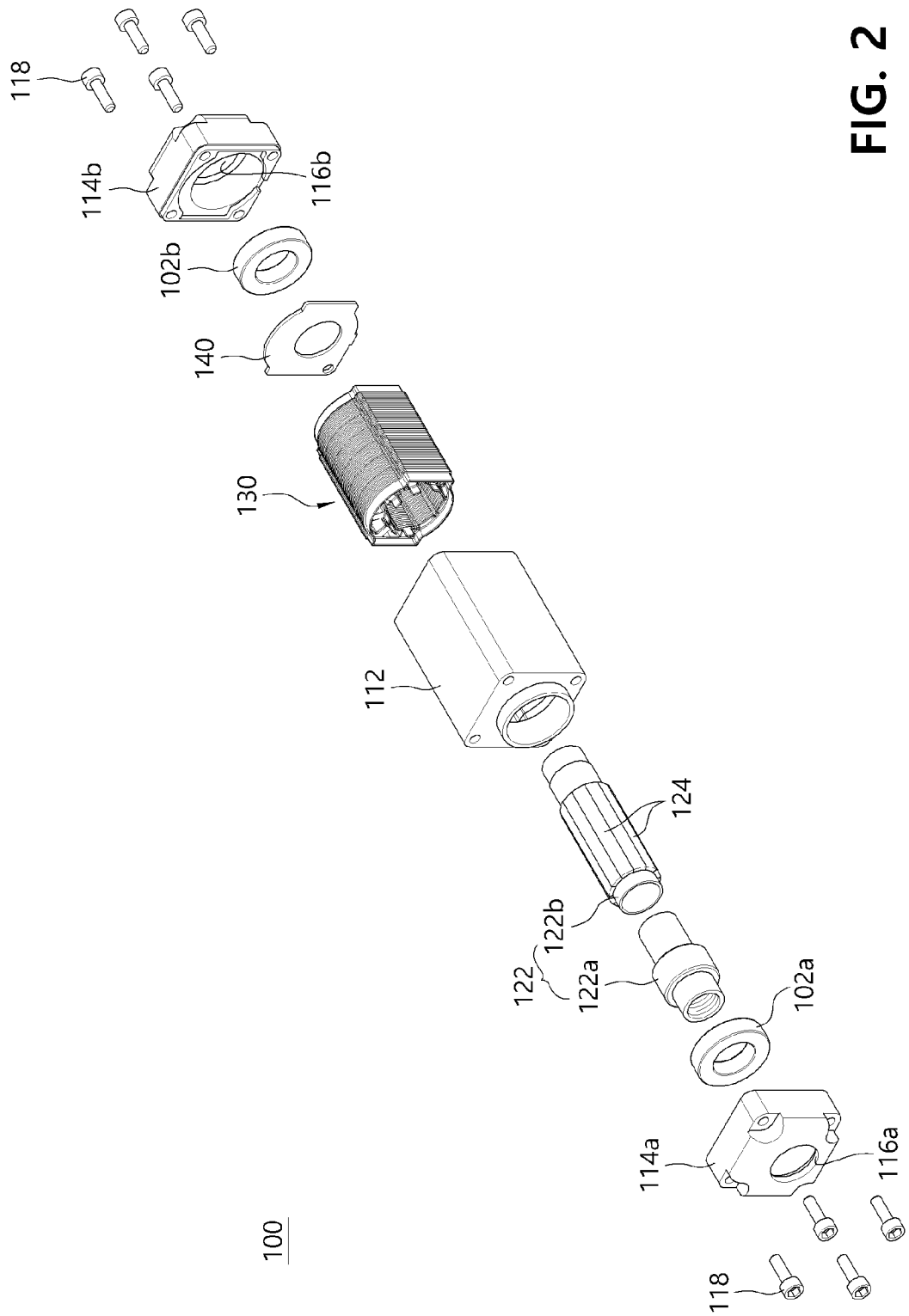
FIG. 2 is an exploded view of a state in which a coil is omitted in FIG. 1.
Figure 3:
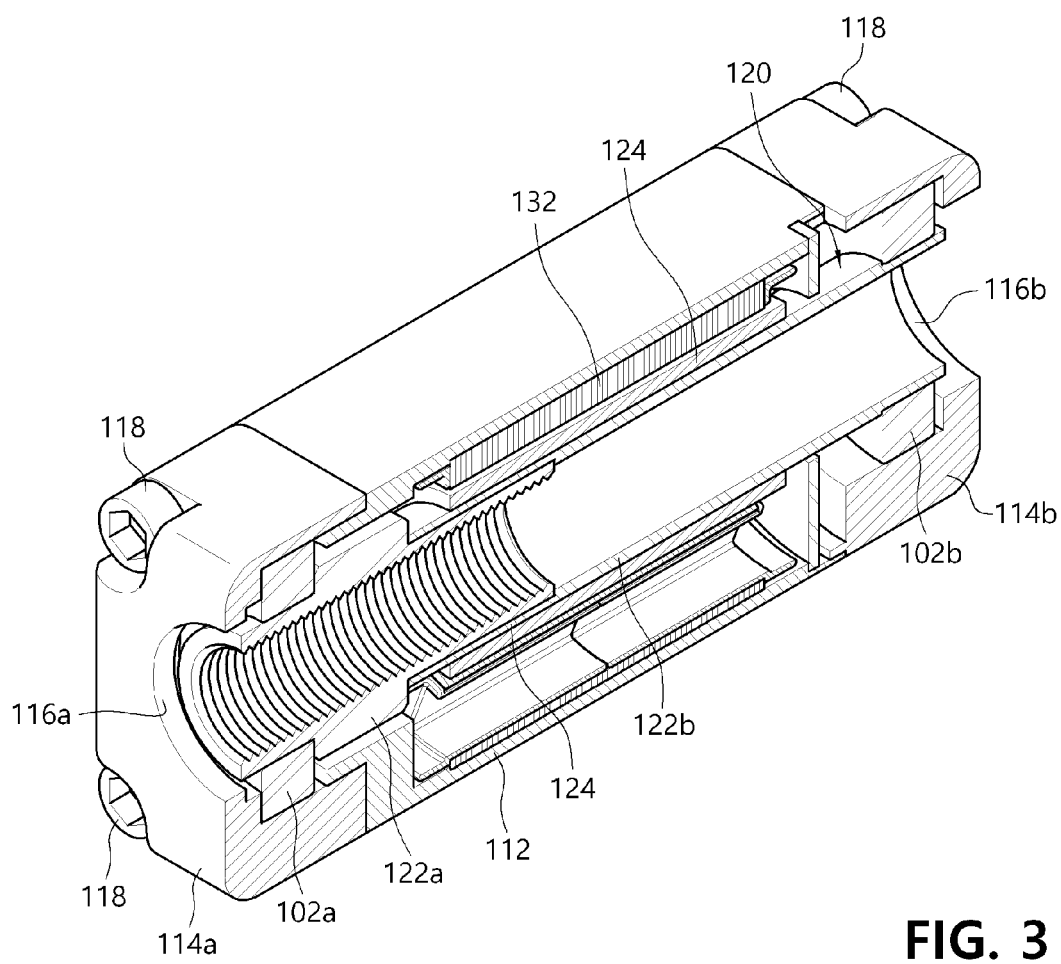
FIG. 3 is a cross-sectional view of the A-A direction in which a coil is omitted in FIG. 1.
Figure 4:
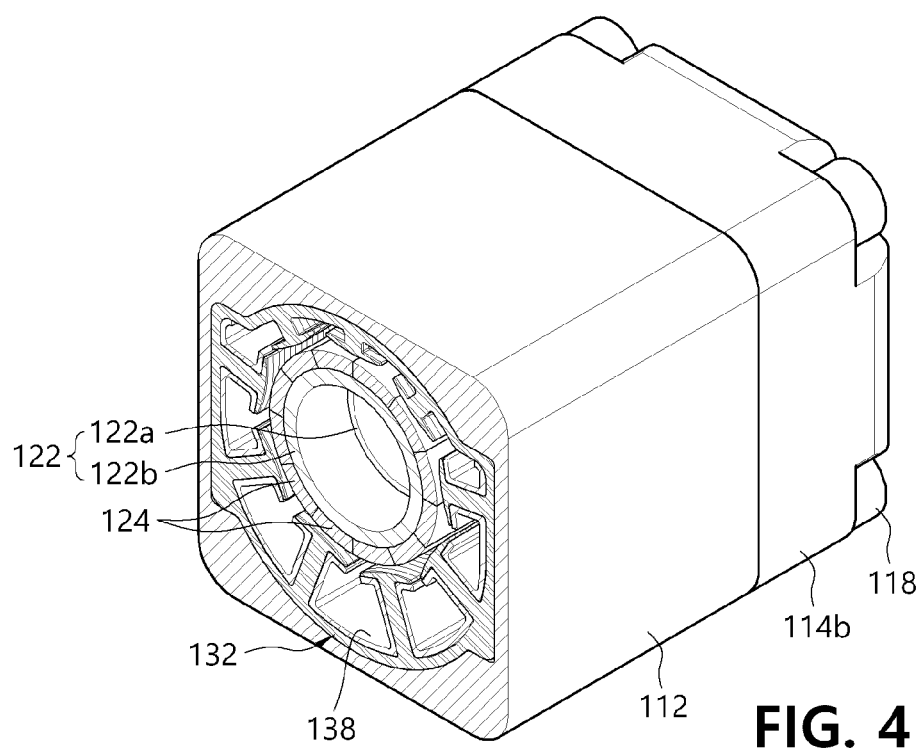
FIG. 4 is a cross-sectional view of the B-B direction in which a coil is omitted in FIG. 1.

The stator part 130, as shown in FIGS. 2 and 3, may have a form in which a plurality of stator cores 132 including the yoke part 133 and the plurality of slot parts 134 are stacked in multiple layers, but is not limited thereto, and may be formed of a single member.

Moreover, when a plurality of stator parts 130 are provided and stacked in the lengthwise direction of the rod 10 such that one surface thereof contacts each other, the plurality of stator cores 132 may be integrally formed via insulating members 138 and 139.

Figure 6:
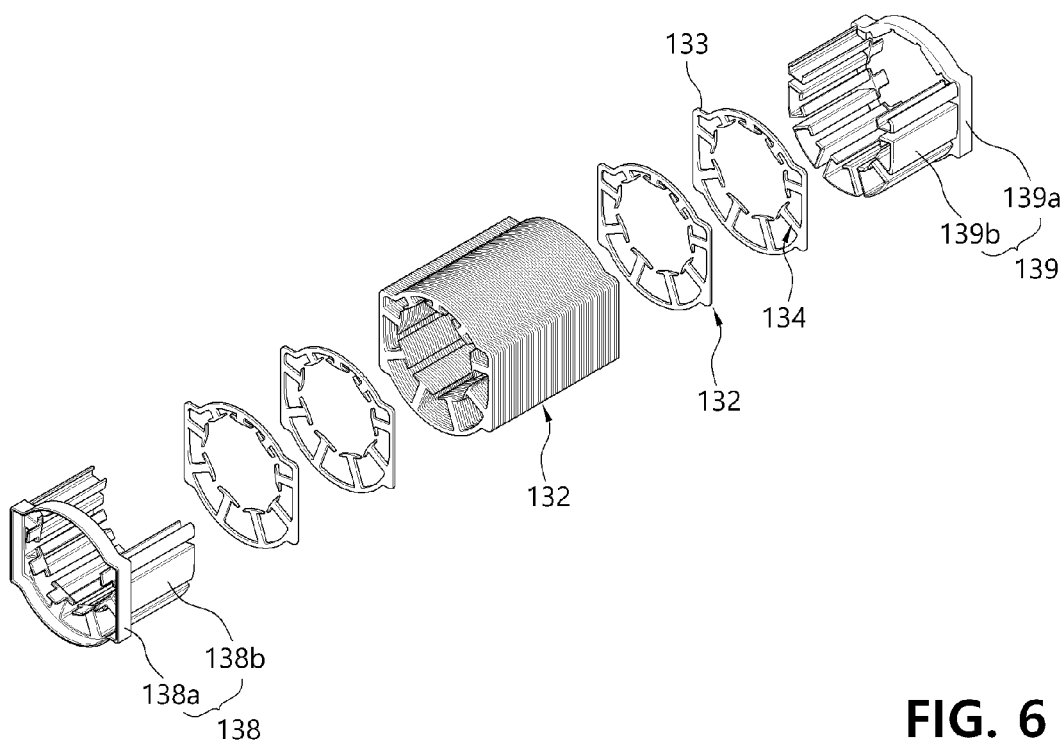
FIG. 6 is a view showing a state in which an insulating member and a stator core applicable to an electric motor according to one embodiment of the present invention are separated.

For example, the insulating members 138 and 139, as shown in FIG. 6, may include a first insulating member 138 and a second insulating member 139 having the corresponding shapes to each other, and the first insulating member 138 and the second insulating member 139 may be mutually coupled through both directions of a plurality of stator cores 132 stacked on each other so that the plurality of stator cores 132 may be fixed.

In that case, the first insulating member 138 and the second insulating member 139 may include closed loop shaped bodies 138a and 139a having a shape corresponding to the yoke part 133 and a plurality of leg parts 138b and 139b extending from the bodies 138a and 139a in a stacking direction of the stator core 132.

Here, when the first insulating member 138 and the second insulating member 139 are fastened to each other, the plurality of leg parts 138b and 139b may be disposed to surround inner circumference of the plurality of slot parts 134 and yoke parts 133 provided in each stator core 132.

That is, the plurality of slot part 134 comprising each of the stator core 132 may be surrounded by the leg parts 138b and 139b of the first insulating member 138 and the second insulating part 139, and the outer circumference of the yoke part 133 comprising each of the stator core 132 may be exposed to the outside without being surrounded by the leg parts 138b and 139b.

Here, the plurality of slot parts 134 may be comprised of slot parts that a coil 137 is wound and slot parts that the coil 137 is not wound, and teeth 134 comprising each of slot parts 134 may have different lengths.

For example, the plurality of slot parts 134 may include a plurality of first slot parts 135, 135', and 135" to which the coil 137 is wound and a plurality of second slot parts 136 to which the coil 137 is not wound, and the teeth 134a of the first slot parts 135, 135', and 135" may be formed to have a longer length than the second slot part 134a of the second slot parts 136.

In addition, the plurality of first slot parts 135, 135', and 135" may be disposed to surround an arc part C1 corresponding to an angle θ among the entire circumference of a virtual circle connecting the shoe 134b of the plurality of second slot parts 136 and the first slot parts 135, 135', and 135", and the plurality of second slot parts 136 may be disposed to surround an arc part C2 corresponding to an angle of 2π-θ among the entire circumference of the virtual circle, and the arc part C2 corresponding to the angle of 2π-θ may correspond to a position corresponding to the lower surface of the housing 110.

Moreover, some of the first slot parts 135 of the plurality of first slot parts 135, 135', and 135" may be formed of teeth 134a having a first length, the other part of the first slot part 135' may be formed as a teeth 134a having a second length that is shorter than the first length, and the remaining first slot part 135" may be formed as a teeth 134a having a third length.

In this case, the first slot part 135 including the teeth 134a having the first length may be disposed to be positioned between the first slot part 135' including the teeth 134a having the second length, and the first slot part 135" including the teeth 134a having the third length may be disposed to be positioned between the first slot part 135' including the teeth 134a having the second length and the second slot part 136.

That is, the first slot part 135 including the teeth 134a having the first length and the plurality of second slot parts 136 may be disposed to be positioned on the opposite side with respect to the center point of the virtual circle.

In this case, the stator core 132 may be disposed such that the plurality of second slot parts 136 are disposed inside the housing 110 to be positioned at a position close to the lower surface of the housing 110.

Accordingly, as shown in FIG. 5, in the electric motor 100 according to one embodiment of the present invention, even if the rotor shaft 122 is disposed inside the housing 110 so that the rotor shaft 122 is positioned in a position partially eccentric from the center of the housing 110 toward the bottom surface, and the yoke part 133 is formed in a non-circular shape, the plurality of first slot parts 135, 135', and 135" and the second slot part 136 may be disposed to surround the entire circumference of the rotor shaft 122, and the second slot part 136 having a tooth a shorter than the teeth 134a comprising the first slot parts 135, 135', and 135" may be disposed at a position close to the lower surface of the housing 110.

Accordingly, in the electric motor 100 according to one embodiment of the present invention as described above, the rod 10 for guiding the movement of the object may be installed at a position close to the bottom surface of the vehicle passenger space, and even when a space between the bottom surface of the vehicle passenger space and the bottom surface of the housing 110 is insufficient, by minimizing the length of the housing 110 protruding downward from the rod 10, the electric motor 100 may be connected to the rod 10 by using a narrow space without contacting the bottom surface of the vehicle passenger space, and may smoothly reciprocate along the rod 10.

Meanwhile, the electric motor 100 according to one embodiment of the present invention may be implemented as a single-phase motor but may be implemented as a multi-phase motor having a plurality of phases when power is applied.

For example, the electric motor 100 according to one embodiment of the present invention may be a motor in which the plurality of slot parts 134 have three phases.

In particular, the plurality of slot parts 134 may have u, v, and w phases when power is applied. Here, "u phase" may be "first phase", "v phase" may be "second phase", "w phase" may be "third phase", and the first phase, second phase, and third phase may be different phases.

In this case, each of a plurality of first slot parts 135, 135' and 135" and a plurality of second slot parts 136 comprising the plurality of slot parts 134 may be implemented to have three phases.

That is, the plurality of first slot parts 135, 135', and 135", when power is applied, may include at least two phase parts among the plurality of first phase parts 135a having the first phase, the plurality of second phase parts 135b having the second phase different from the first phase, and the plurality of third phase parts 135c having the third phase different from the first phase and the second phase. In addition, the plurality of second slot parts 136, when power is applied, may also include at least two phase parts among the first phase part 136a having the first phase, the second phase part 136b having the second phase, and the third phase part 136c having the third phase that are corresponding to the plurality of first slot parts 135, 135', and 135".

As a non-limiting example, the electric motor 100 according to one embodiment of the present invention is illustrated in FIG. 5 is implemented in a 3:4 structure in which nine slot parts 134 including six first slot parts 135, 135', and 135" to which the coil 137 is wound and three second slot parts 136 to which the coil 137 is not wound are provided, and twelve magnets 124 are provided in the rotor part 120, two first slot parts among the six first slot parts 135, 135', and 135" may be the first phase part 135a, and the other two first slot parts may be the second phase part 135b, and the other two first slot parts may be the third phase part 135c. In this case, one of the three second slot parts 136 may be the first phase part 136a, the other may be the second phase part 136b, and the other may be the third phase part 136c.

The total number of turns of the coil 137 wound around the first slot part sides having the same phases among the plurality of first slot parts 135, 135', and 135" may have the same number of turns, or the number of turns of the coil 137 wound around the plurality of first slot parts having the same phases may have different number of turns.

For example, the total number of turns of the coil 137 wound around the two first phase parts 135a, the total number of turns of the coil 137 wound around the two second phase parts 135b, and the total number of turns of the coil 137 wound around the two third phase parts 135c may be the same, and the number of turns of the coil 137 wound around the two first phase parts 135a, respectively, the number of turns of the coil 137 wound around the two second phase parts 135b, respectively, and the number of turns of the coil 137 wound on each of the two third phase parts 135c may have different number of turns.

Therefore, as described above, even if the lengths of each of the teeth 134a comprising the plurality of first slot parts 135, 135', and 135" are different from each other, the total number of turns of the coil wound around the first phase part 135a, the second phase part 135b, and the third phase part 135c may have the same number of turns.

Accordingly, in the electric motor 100 according to one embodiment of the present invention as described above, even if the rotor part 120 is disposed at a position eccentric to one side inside the housing 110 and has different lengths of the teeth 134a comprising each slot part 134, the total number of turns of the coil wound on the side of the first slot part having the same phase among the plurality of first slot parts 135, 135' and 135" may have the same number of turns, and the plurality of slot parts 134 may be disposed to surround the total circumference of the rotor part 120.

As a result, even when the electric motor 100 according to one embodiment of the present invention is implemented as a multi-phase motor, the efficiency of the motor may be prevented from being degraded by having the same total number of turns of coil comprising each phase.

On the other hand, in the drawing, a 3:4 structure in which the total number of slot parts 134 is nine and the total number of magnets is 12 is illustrated, but the present invention is not limited thereto, the ratio of the total number of magnets to the number of slots may be changed to any one of structures of 3:2, 9:8, 9:10, and 1:1, and may be implemented as a motor having any one of three phases, a multi-phase except for three phases, and a single-phase.

While the exemplary embodiment of the present invention has been described above, the spirit of the present invention is not limited to the exemplary embodiment disclosed in the present specification, and those skilled in the art, who understand the spirit of the present invention, may easily propose other exemplary embodiments by adding, changing, deleting, or modifying constituent elements without departing from the spirit of the present invention, and the exemplary embodiments are also included in the spirit and the scope of the present invention.

The invention claimed is:

1. An electric motor for reciprocating an object in a straight line along a rod having a predetermined length, the electric motor comprising:
a housing;
a rotor part including a rotor shaft rotatably mounted inside the housing via a bearing and axially coupled to the rod to reciprocate in a straight line along the rod when rotating, and a plurality of magnets mounted in a circumferential direction of the rotor shaft; and a stator part including at least one stator core including a closed loop-shaped yoke part embedded in the housing to surround a circumference of the rotor part and a plurality of slot parts extending from the yoke part toward the rotor part, and a coil wound around at least one slot part among the plurality of slot parts, wherein the stator core includes a plurality of first slot parts in which coils are wound and a plurality of second slot parts in which the coils are not wound, wherein the plurality of first slot parts are disposed to surround a first arc part corresponding to an angle of θ among an entire circumference of a virtual circle connecting the ends of the plurality of first slot parts and the plurality of second slot parts, wherein the plurality of second slot parts are disposed to surround a second arc part corresponding to an angle of 2π-θ among the entire circumference of the virtual circle excluding the first arc part, wherein the angle of θ is greater than the angle of 2π-θ, wherein each of the plurality of second slot parts is extended from the yoke part to the rotor shaft by a predetermined length so as to have a shorter length than the plurality of first slot parts, wherein the plurality of first slot parts are disposed to a position closer to an upper surface of the housing, wherein the plurality of second slot parts are disposed to a position closer to a lower surface of the housing, wherein the rotor shaft is disposed to be located at an eccentric position closer to the lower surface of the housing than to the upper surface of the housing from the center of the housing, wherein the object is fixed to the upper surface of the housing, wherein the rotor shaft is positioned at a position close to a bottom surface of a space including the object, wherein the plurality of first slot parts include:

a first set of first slot parts is formed of a first teeth having a first length;

a second set of first slot parts is formed as a second teeth having a second length that is shorter than the first length; and a third set of first slot parts is formed as a third teeth having a third length, wherein the first set of first slot parts is positioned between the second set of first slot parts, and the third set of first slot parts is positioned between the second set of first slot parts and the plurality of second slot parts, wherein the first teeth, the second teeth and the third teeth have a length longer than teeth of the plurality of second slot parts, and wherein the first set of first slot parts and the plurality of second slot parts are disposed to be positioned on an opposite side with respect to a center point of the virtual circle.

2. The electric motor of claim 1, wherein
the slot part includes teeth extending in a predetermined length from the yoke part and a shoe formed at an end of the teeth.

3. The electric motor of claim 1, wherein
the slot part includes teeth extending in a predetermined length from the yoke part and a shoe formed at an end of the teeth.

4. The electric motor of claim 1, wherein
the plurality of the first slot parts, when power is applied, includes a plurality of first phase parts having a first phase and a plurality of second phase parts having a second phase different from the first phase, wherein the total number of turns of the coil wound around the plurality of first phase parts and the total number of turns of the coil wound around the plurality of second phase parts are the same.

5. The electric motor of claim 4, wherein
the plurality of first phase parts has a different total number of turns of coil wound around each of the first phase part.

6. The electric motor of claim 4, wherein
the plurality of second slot parts has the corresponding phase as the plurality of first slot parts when power is applied.

7. The electric motor of claim 1, wherein
the rotor shaft includes a first rotor shaft axially coupled to the rod to reciprocate in a straight line along the rod when rotating, and a second rotor shaft axially coupled to the first rotor shaft and having a plurality of magnets installed in a circumferential direction.

8. The electric motor of claim 1, wherein
the stator part includes a plurality of stator cores stacked in a lengthwise direction of the rod such that one surface thereof contacts each other, and
the plurality of stator cores is integrated with each other via an insulating member.

9. The electric motor of claim 1, wherein
the rotor shaft is disposed to be positioned at an eccentric position inside of the housing.

10. The electric motor of claim 1, wherein
the object is an electrically powered seat of a vehicle.

* * * * *